US009667673B2

(12) United States Patent
Fang et al.

(10) Patent No.: US 9,667,673 B2
(45) Date of Patent: May 30, 2017

(54) EXTENDING EPON MULTI-POINT CONTROL PROTOCOL TO RUN ON ETHERNET PON OVER COAX NETWORKS

(71) Applicant: Futurewei Technologies, Inc., Plano, TX (US)

(72) Inventors: Liming Fang, Cupertino, CA (US); Jim Chen, Corona, CA (US); Li Zhang, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 77 days.

(21) Appl. No.: 14/673,461

(22) Filed: Mar. 30, 2015

(65) Prior Publication Data

US 2015/0207826 A1  Jul. 23, 2015

Related U.S. Application Data

(63) Continuation of application No. 13/789,318, filed on Mar. 7, 2013, now Pat. No. 9,025,960.

(60) Provisional application No. 61/607,734, filed on Mar. 7, 2012.

(51) Int. Cl.
| | |
|---|---|
| *H04B 10/27* | (2013.01) |
| *H04N 7/10* | (2006.01) |
| *H04N 7/173* | (2011.01) |
| *H04N 7/26* | (2006.01) |
| *H04L 29/06* | (2006.01) |
| *H04L 12/24* | (2006.01) |

(52) U.S. Cl.
CPC ......... *H04L 65/1073* (2013.01); *H04B 10/27* (2013.01); *H04L 41/0806* (2013.01); *H04L 41/12* (2013.01)

(58) Field of Classification Search
None
See application file for complete search history.

(56) References Cited

U.S. PATENT DOCUMENTS

| | | | |
|---|---|---|---|
| 6,058,421 A | 5/2000 | Fijolek et al. | |
| 6,466,986 B1 | 10/2002 | Sawyer et al. | |
| 7,072,337 B1 | 7/2006 | Arutyunov et al. | |
| 7,099,338 B1 | 8/2006 | Lee | |
| 8,036,530 B2 | 10/2011 | Arnold et al. | |
| 8,041,335 B2 | 10/2011 | Khetawat et al. | |
| 8,831,425 B1 | 9/2014 | Bernstein et al. | |

(Continued)

FOREIGN PATENT DOCUMENTS

| | | |
|---|---|---|
| CN | 1977494 A | 6/2007 |
| EP | 2117167 A1 | 11/2009 |
| WO | 2011031831 A1 | 3/2011 |

OTHER PUBLICATIONS

"Broadcom Introduces DOCSIS®-based EoC for EPON Product Portfolio in Support of China's Network Convergence," Press Release, Hangzhou, Oct. 27, 2010, /PRNewswire via COMTEX News Network/—ICTC 2010—Broadcom Corporation, 2 pgs.

(Continued)

*Primary Examiner* — Oommen Jacob
(74) *Attorney, Agent, or Firm* — Conley Rose, P.C.

(57) ABSTRACT

A method implemented by a middlebox comprising registering a customer premises equipment (CPE) in the middlebox, wherein the CPE is coupled to the middlebox via an electrical line, and facilitating registration of the CPE in a central office (CO) equipment coupled to the middlebox.

14 Claims, 7 Drawing Sheets

(56) References Cited

U.S. PATENT DOCUMENTS

| | | |
|---|---|---|
| 2002/0021472 A1 | 2/2002 | Nakaishi et al. |
| 2002/0067802 A1 | 6/2002 | Smith et al. |
| 2003/0014762 A1 | 1/2003 | Conover et al. |
| 2003/0070063 A1 | 4/2003 | Boyle et al. |
| 2004/0062256 A1 | 4/2004 | Takeuchi et al. |
| 2004/0233926 A1 | 11/2004 | Cummings |
| 2005/0005154 A1 | 1/2005 | Danforth et al. |
| 2005/0053010 A1 | 3/2005 | Smith |
| 2005/0071492 A1 | 3/2005 | Li et al. |
| 2005/0089009 A1 | 4/2005 | Raleigh et al. |
| 2006/0129816 A1 | 6/2006 | Hinton |
| 2007/0022469 A1 | 1/2007 | Cooper et al. |
| 2007/0180142 A1 | 8/2007 | Small et al. |
| 2007/0180483 A1 | 8/2007 | Popoviciu et al. |
| 2007/0189771 A1* | 8/2007 | Kim .................. H04J 3/1694 398/69 |
| 2007/0248120 A1 | 10/2007 | Ali et al. |
| 2007/0264017 A1 | 11/2007 | Mizutani et al. |
| 2007/0276943 A1 | 11/2007 | Marez et al. |
| 2008/0101793 A1 | 5/2008 | Koch et al. |
| 2008/0162637 A1 | 7/2008 | Adamczyk et al. |
| 2008/0232801 A1 | 9/2008 | Arnold et al. |
| 2008/0235185 A1 | 9/2008 | Fratti et al. |
| 2009/0067850 A1 | 3/2009 | Mizutani et al. |
| 2009/0103918 A1 | 4/2009 | Tsuge et al. |
| 2009/0232498 A1* | 9/2009 | Tsuge .................. H04L 41/0226 398/58 |
| 2009/0310615 A1 | 12/2009 | Bernard et al. |
| 2010/0020690 A1 | 1/2010 | Komiya et al. |
| 2010/0074096 A1 | 3/2010 | Underwood et al. |
| 2010/0074167 A1 | 3/2010 | Dale et al. |
| 2010/0083330 A1 | 4/2010 | Bernstein et al. |
| 2010/0131971 A1 | 5/2010 | Hegglin et al. |
| 2010/0177645 A1 | 7/2010 | Kang et al. |
| 2010/0238950 A1 | 9/2010 | Beser |
| 2010/0260259 A1 | 10/2010 | Kimmich et al. |
| 2011/0013540 A1 | 1/2011 | O'Mahony |
| 2011/0026930 A1 | 2/2011 | Cui et al. |
| 2011/0116419 A1 | 5/2011 | Cholas et al. |
| 2011/0202956 A1 | 8/2011 | Connelly et al. |
| 2011/0271313 A1 | 11/2011 | Urban et al. |
| 2012/0023522 A1 | 1/2012 | Anderson et al. |
| 2012/0057865 A1 | 3/2012 | Hasewaga et al. |
| 2012/0128349 A1 | 5/2012 | Mitsunaga et al. |
| 2012/0257893 A1 | 10/2012 | Boyd et al. |
| 2012/0294613 A1 | 11/2012 | Hood et al. |
| 2013/0045005 A1 | 2/2013 | Nakura et al. |
| 2013/0117425 A1 | 5/2013 | Jarl |
| 2013/0148972 A1 | 6/2013 | Kazawa et al. |
| 2013/0236177 A1* | 9/2013 | Fang .................. H04L 12/2801 398/66 |
| 2013/0236185 A1* | 9/2013 | Fang .................. H04L 65/1073 398/115 |
| 2013/0322504 A1 | 12/2013 | Asati et al. |

OTHER PUBLICATIONS

"Operating the EPON Protocol over Coaxial Distribution Networks Call for Interest," IEEE 802.3 Ethernet Working Group, Atlanta, Georgia, Nov. 8, 2011, pp. 1-38.

Chen, J., "An Example of Designing a Coax Convergence Layer in EPoC," Huawei, XP002713588, Jun. 22, 2012, 9 pages.

IEEE Std 802.3, "Part 3: Carrier Sense Multiple Access with Collision Detection (CSMA/CD) Access Method and Physical Layer Specifications,"—Section 5, 2008, pp. 1-615.

Foreign Communication From a Counterpart Application, PCT Application PCT/US2013/029677, International Search Report dated May 17, 2013, 4 pages.

Foreign Communication From a Counterpart Application, PCT Application PCT/US2013/029677, Written Opinion dated May 17, 2013, 4 pages.

Office Action dated Jul. 15, 2014, U.S. Appl. No. 13/789,318, filed Mar. 7, 2013, 28 pages.

Office Action dated Dec. 29, 2014, U.S. Appl. No. 13/789,318, filed Mar. 7, 2013, 11 pages.

Notice of Allowance dated Mar. 12, 2015, U.S. Appl. No. 13/789,318, filed Mar. 7, 2013, 5 pages.

Foreign Communication From a Counterpart Application, Chinese Application No. 201380011926.4, Chinese Office Action dated Nov. 3, 2016, 4 pages.

Foreign Communication From a Counterpart Application, Chinese Application No. 201380011926.4, Chinese Search Report dated Oct. 25, 2016, 2 pages.

* cited by examiner

EXTENDING EPON MULTI-POINT CONTROL PROTOCOL TO RUN ON ETHERNET PON OVER COAX NETWORKS

CROSS-REFERENCE TO RELATED APPLICATIONS

This application is a continuation of U.S. patent application Ser. No. 13/789,318 filed Mar. 7, 2013 by Futurewei Technologies, Inc. and titled "Extending EPON Multi-Point Control Protocol to Run on Ethernet PON Over Coax Networks," which claims priority to U.S. provisional patent application No. 61/607,734 filed Mar. 7, 2012 by Liming Fang, et al., and titled "Method and Apparatus of Extending EPON MPCP to Run on Ethernet PON Over Coax Network (EPoC)," both of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is a system for providing network access over "the last mile." In a downstream direction, the PON may be a point-to-multi-point (P2MP) network comprising an optical line terminal (OLT) at a central office, an optical distribution network (ODN), and a plurality of optical network units (ONUs) at customer premises. Ethernet passive optical network (EPON) is a PON standard developed by the Institute of Electrical and Electronics Engineers (IEEE) and specified in IEEE 802.3ah, which is incorporated herein by reference as if reproduced in its entirety. EPON may provide a simple and flexible way of using optical fiber for broadband service in the last mile.

In EPON, an optical fiber may be used for both upstream and downstream transmissions with different wavelengths. The optical line terminal (OLT) may implement an EPON media access control (MAC) layer for transmission of Ethernet frames. A multi-point control protocol (MPCP) may perform various services such as bandwidth assignment, bandwidth polling, auto-discovery, and ranging. Ethernet frames may be broadcasted downstream based on a logical link identifier (LLID) embedded in a preamble of each frame. On the other hand, upstream bandwidth may be assigned based on the exchange of Gate and Report messages between messages between an OLT and an ONU.

Recently, hybrid access networks employing both EPON and other network types have attracted growing attention. For example, Ethernet over Coax (EoC) may be a generic name used to describe all technologies that transmit Ethernet frames over a unified optical-coaxial (coax) network. Examples of EoC technologies may include EPON over coax (EPoC), data over cable service interface specification (DOCSIS), multimedia over coax alliance (MoCA), G.hn (a common name for a home network technology family of standards developed under the International Telecommunication Union (ITU) and promoted by the HomeGrid Forum), home phoneline networking alliance (HPNA), and home plug audio/visual (A/V). EoC technologies may have been adapted to run outdoor coax access from an ONU to an EoC head end with connected customer premises equipment (CPEs) located in subscriber homes.

There is a rising demand to use EPON as an access system to interconnect with multiple coax cables to terminate coax network units (CNUs) located in a subscriber's home with an EPoC architecture. In an EPoC system, as a physical (PHY) layer in the optical network portion may be relatively cleaner than a physical layer in the coax network portion, one may need to establish channel communication between CNUs and OLT before transmission of data. Some traditional discovery and registration approaches may use EPON MPCP for registration of coaxial line terminals (CLTs). However, traditional MPCP may not be used for the coax network portion. Thus, it is desirable to extend the EPON MPCP to the coax portion of an EPoC network, where noises may be higher.

SUMMARY

In one embodiment, the disclosure includes a method implemented by a middlebox comprising registering a customer premises equipment (CPE) in the middlebox, wherein the CPE is coupled to the middlebox via an electrical line, and facilitating registration of the CPE in a central office (CO) equipment coupled to the middlebox.

In another embodiment, the disclosure includes an apparatus comprising a processor configured to register a customer premises equipment (CPE) remotely coupled to the apparatus via an electrical line, and facilitate registration of the CPE in a central office (CO) equipment coupled to the apparatus.

In yet another embodiment, the disclosure includes a method comprising receiving a first discovery message from a middlebox coupled to a customer premises equipment (CPE) via an electrical line, transmitting a first register request message to the middlebox in response to the first discovery message, receiving a first register message from the middlebox, wherein the first register message comprises a physical layer identifier (PHY ID) for the CPE; and receiving a second discovery message from the middlebox, wherein the second discovery message comprises an identifier (ID) for a central office (CO) equipment coupled to the middlebox.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
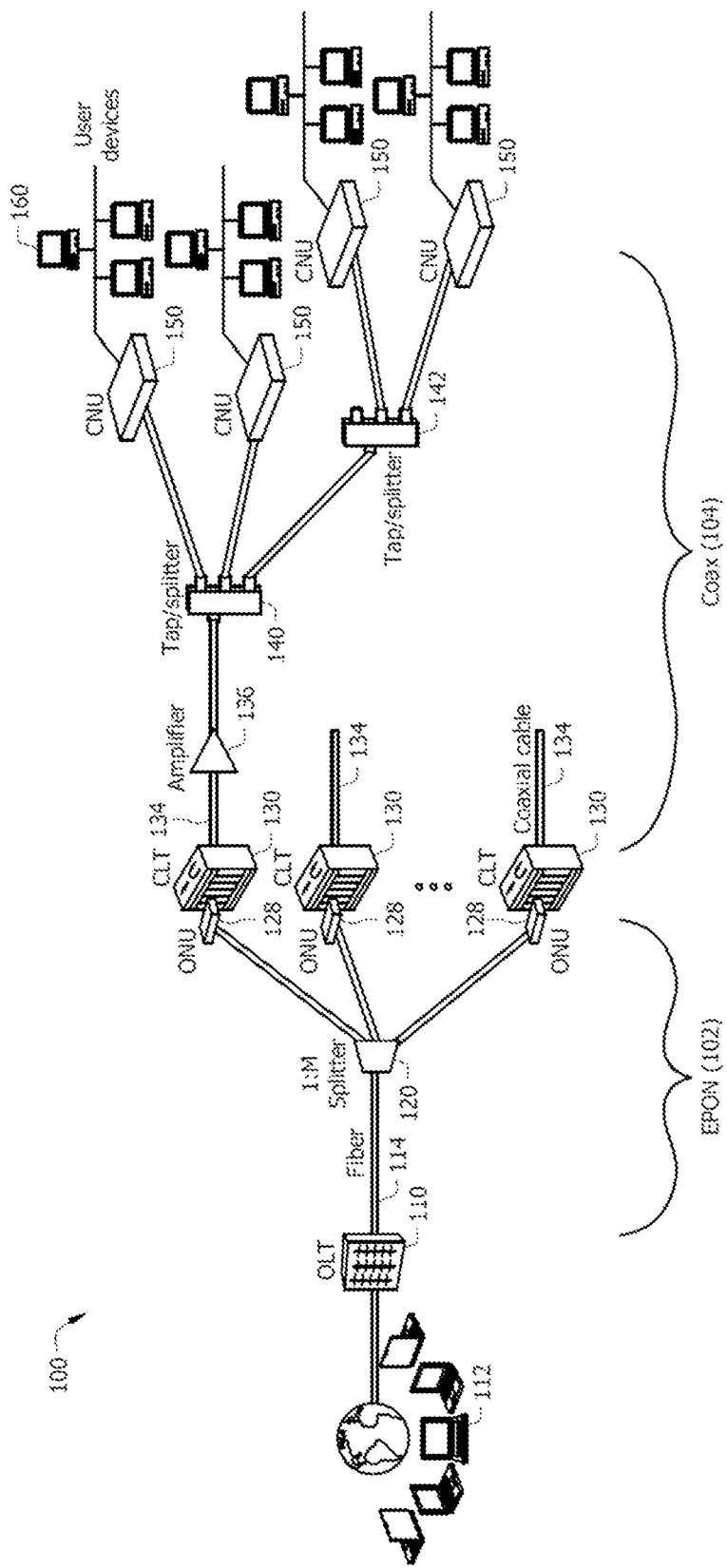
FIG. 1 illustrates an embodiment of an EPoC network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Based on needs at any time (in other words, on demand), a customer may switch a CNU off and on as desired. The non-contention based design of EPON as well as EPoC MAC layer may be such that ONUs/CNUs do not transmit data upstream until they have been allocated a timeslot through a GATE message. Hence, after a CNU is switched on, it may stay in an idle state until and unless an OLT assigns it a timeslot, during which it can send data upstream to the OLT. To solve this problem, the EPoC MAC layer may need to implement an automatic discovery and registration process for CNUs by the OLT. In an EPoC base system, services may be labeled as LLIDs. In order to implement end-to-end services, OLT and CNU may need to establish LLID registration, where the OLT may assign a unique LLID to each CNU (or to each service within a CNU, in which case the CNU may have multiple LLIDs) during the registration process.

In an EPON, the optical PHY may be relatively cleaner (e.g., less noise signals) than the coax PHY of a coax network. Hence, EPON may not need to establish PHY channel communication before transmission. However, coax PHY may be noisier and need to perform channel training and/or estimation, such as frequency domain equalization (FEQ), ranging, and sounding, etc., before transmission. The coax PHY negotiation process may be decoupled from the EPON MAC layer discovery and registration. One of the goals of this disclosure is to develop a point-to-multipoint coax PHY auto negotiation mechanism, which may comprise coax PHY discovery and parameters negotiations. This process may be independent from the EPON MAC, thus the OLT may have no knowledge of the CNU registration process. After the coax PHY negotiation is complete, the EPoC MAC registration may start, and the OLT may discover newly connected CNUs and assign them LLIDs.

Disclosed herein are systems, apparatus, and methods for extending EPON MPCP to a non-optical portion of a hybrid access network, such as an EPoC or a DOCSIS network. Using an EPoC as an example, to establish a communication channel between a CNU (coupled to a CLT via an electrical line) and an OLT (coupled to the CLT via an optical line), the CLT may register the CNU in itself first, and then facilitate registration of the CNU in the OLT. Various messages may be exchanged between the three parties to perform registration, including for example, discovery messages, register request messages, register messages, register acknowledge messages, etc. PHY parameters and other tasks may also be performed. After registering a CNU in an OLT, the OLT may assign a LLID to the CNU. The CLT may snoop this process, that is, copying the LLID and storing in a memory in the CLT.

Refer now to FIG. 1, which illustrates an embodiment of an EPoC network 100 comprising an optical portion or segment 102 and an electrical segment 104. The optical segment 102 may essentially be a PON and the electrical segment 104 may be a coaxial cable network. The optical segment 102 may comprise an OLT 110 and one or more ONUs 128 coupled to the OLT 110 via an optical distribution network (ODN). The ODN may comprise an optical line or fiber 114 and an optical splitter 120 that couples the OLT 110 to an ONU 128. Similarly, the electrical segment 104 may comprise one or more CLTs 130, each of which may be coupled to a plurality of CNUs 150 via an electrical distribution network (EDN). The EDN may comprise coax cables 134, amplifiers 136 (only one shown as an example), and cable taps or splitters 140 and 142.

In the EPoC network 100, each ONU 128 and its corresponding CLT 130 may be fused together into a single box. The ONU-CLT box may act as a single device, which may reside at the curb or basement of a house or an apartment building. The ONU-CLT box may form an interface between the optical and electrical segments 102 and 104. Following convention in the art, unless otherwise noted, hereinafter a box including an ONU 128 and a CLT 130 may simply be referred to as a CLT 130 that has ONU functionalities. It should be understood that the EPoC network 100 may comprise any number of CLTs 130 and corresponding CNUs 150 for each OLT 110. The components of the EPoC network 100 may be arranged as shown in FIG. 1 or any other suitable arrangement.

The optical segment 102 may be a communication network that does not require any active components to distribute data between the OLT 110 and the CLTs 130. Instead, the optical segment 102 may use the passive optical components in the ODN to distribute data between the OLT 110 and the CLT 130. The optical fiber 114 may have any suitable rating, such as 1 or 10 Giga bits per second (Gbps). Examples of suitable protocols that may be implemented in the optical segment 102 to include asynchronous transfer mode PON (APON) and the broadband PON (BPON) defined by the ITU Telecommunication Standardization Sector (ITU-T) G.983 standard, Gigabit PON (GPON) defined by the ITU-T G.984 standard, the EPON defined by the IEEE 802.3ah standard, and the wavelength division multiplexing (WDM) PON (WDM-PON).

The OLT 110 may be any device configured to communicate with the CNUs 150 via the CLT 130. The OLT 110 may reside in a local exchange, which may be a central office (CO). Further, the OLT 110 may couple or connect the EPoC network 100 to another network 112, which be any type of network such as an Internet, synchronous optical network (SONET), or asynchronous transfer mode (ATM) backbone. For example, the OLT 110 may act as an intermediary between the CLTs 130 and the network 112. Specifically, the OLT 110 may forward data received from the network 112 to the CLTs 130, and forward data received from the CLTs 130 onto the network 112. Although the specific configuration of the OLT 110 may vary depending on the type of optical protocol implemented in the optical segment 102, in an embodiment, the OLT 110 may comprise an optical transmitter and an optical receiver. When the network 112 is using a network protocol that is different from the protocol used in the optical segment 102, the OLT 110 may comprise a converter that converts the protocol of the network 112 to the protocol of the optical segment 102. The OLT converter may also convert the optical segment 102 protocol into the network 112 protocol.

The ODN between the OLT 110 and the CLTs 130 may be a data distribution system that may comprise optical fiber cables, couplers, splitters, distributors, and/or other equipment. In data transmission, Ethernet packets from the OLT 110 may pass through a 1×M passive splitter or a cascade of splitters and reach each of the CLTs 130, where M may denote a number of CLTs in the EPoC network 100. M may have any suitable value, such as 4, 8, or 16, and may be decided by an operator depending on factors like an optical power budget. Thus, packets may be broadcasted by the OLT 110 and selectively extracted by the CLTs 130. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the CLTs 130. It should be noted that, if needed, the optical fiber cables may be replaced by any optical transmission media. In some embodiments, the ODN may comprise one or more passive or active optical amplifiers. The ODN may extend from the OLT 110 to the CLTs 130 including ONUs in a branching configuration as shown in FIG. 1, but may be alternatively configured as determined by a person of ordinary skill in the art.

The CLTs 130 may be remotely coupled to the OLT 110. In some embodiments, one or more CLTs may be located within the OLT 110. In the downstream direction, each CLT 130 may be any device or component configured to receive downstream data from the OLT 110, process the downstream data, and transmit the processed downstream data to corresponding CNUs 150. The CLT 130 may convert the downstream data appropriately to transfer the data between the optical segment 102 and the electrical segment 104. Although terms "upstream" and "downstream" may be used throughout to denote the locations of various network features relative to the OLT or similar unit, those skilled in the art will appreciate that the data flow on the network in the embodiments of the disclosure is bi-directional. Downstream data received by a CLT 130 may be in the form of optical signals, and downstream data transmitted by a CLT 130 may be in the form of electrical signals that may have a different logical structure as compared with the optical signals. In some embodiments, the CLT 130 is transparent to the CNUs 150 and the OLT 110 in the sense that downstream data sent from the OLT 110 to the CNU 150 may be directly addressed to the CNU 150 (e.g. using a LLID or a destination address), and vice-versa. As such, the CLT 130 intermediates between network segments, namely an optical segment 102 and an electrical segment 104 in the example of FIG. 1.

The electrical segment 104 of the EPoC network 100 may be similar to any known electrical communication system. For example, the electrical segment 104 may also be a P2MP network. Downstream data from a CLT 130 may pass through amplifier(s) and a tap or splitter or a cascade of taps or splitters to reach one or more CNUs 150. In an embodiment, downstream data transmission from a CLT 130 to CNUs 150 may not be a broadcast; instead, a media access plan (MAP) may be used to allocate different sub-carrier groups to different CNUs using orthogonal frequency-division multiple access. Thus, in some cases, downstream transmissions may be unicast from the OLT 110 to the CNUs 150.

The electrical segment 104 may not require any active components to distribute data between the CLTs 130 and the CNUs 150. Instead, the electrical segment 104 may use the passive electrical components in the electrical segment 104 to distribute data between the CLTs 130 and the CNUs 150. Alternatively, the electrical segment 104 could use some active components, such as amplifiers 136. Examples of suitable protocols that may be implemented in the electrical segment 104 include MoCA, G.hn, HPNA, and Home Plug A/V, etc. The EDN between the CLTs 130 and the CNUs 150 may be a data distribution system that comprises electrical cables (e.g. coaxial cable and twisted wires), couplers, splitters, distributors, and/or other equipment. In an embodiment, the electrical cables, couplers, splitters, distributors, and/or other equipment are passive electrical components. Specifically, the electrical cables, couplers, splitters, distributors, and/or other equipment may be components that do not require any power to distribute data signals between the CLT 130 and the CNU 150. It should be noted that, if needed, the electrical cables may be replaced by any electrical transmission media. In some embodiments, the EDN may comprise one or more electrical amplifiers 136. The EDN may extend from each CLT 130 to its corresponding CNUs 150 in a branching configuration as shown in FIG. 1, but may be alternatively configured as determined by a person of ordinary skill in the art.

In an embodiment, each CNU 150 may be any device configured to communicate with the OLT 110, the CLT 130, and any user devices 160. Specifically, the CNUs 150 may act as an intermediary between the OLT 110 and the user devices 160. For example, each port of the OLT 110 may serve 32, 64, 128, or 256 CNUs, and depending on the number of CNUs present in the EPoC network 100, a suitable number (e.g., 4, 8, or 16) of CLTs 130 may be deployed per OLT port. An examplary distance between the OLT 110 and a CLT 130 may be in the range of 10 to 20 kilometers, and an examplary distance between a CLT 130 and a CNU 150 may be in the range of 100 to 500 meters. Further, each CNU 130 may serve any suitable number (e.g., 3 or 4) of subscribers or user devices 160. For instance, the CNUs 150 may forward data received from the OLT 110 to the user devices 160, and forward data received from the user devices 160 onto the OLT 110.

Although the specific configuration of the CNUs 150 may vary depending on the type of network 100, in an embodiment a CNU 150 may comprise an electrical transmitter configured to send electrical signals to a CLT 130 and an electrical receiver configured to receive electrical signals from the CLT 130. Additionally, the CNU 150 may comprise a converter that converts the electrical signal into electrical signals for the user devices 160, such as signals in an ATM protocol, and a second transmitter and/or receiver that may send and/or receive the electrical signals to the user devices 160. In some embodiments, CNUs 150 and coaxial network terminals (CNTs) are similar, and thus the terms are used interchangeably herein. The CNUs 150 may typically be located at end-user locations, such as the customer premises, but may be located at other locations as well.

The user devices 160 may be any devices configured to interface with a user or subscriber. For example, the user devices 160 may include desktop computers, laptop computers, tablets, mobile phones, smartphones, telephones, mobile telephones, residential gateways, televisions, set-top boxes, and so forth.

Figure 2:
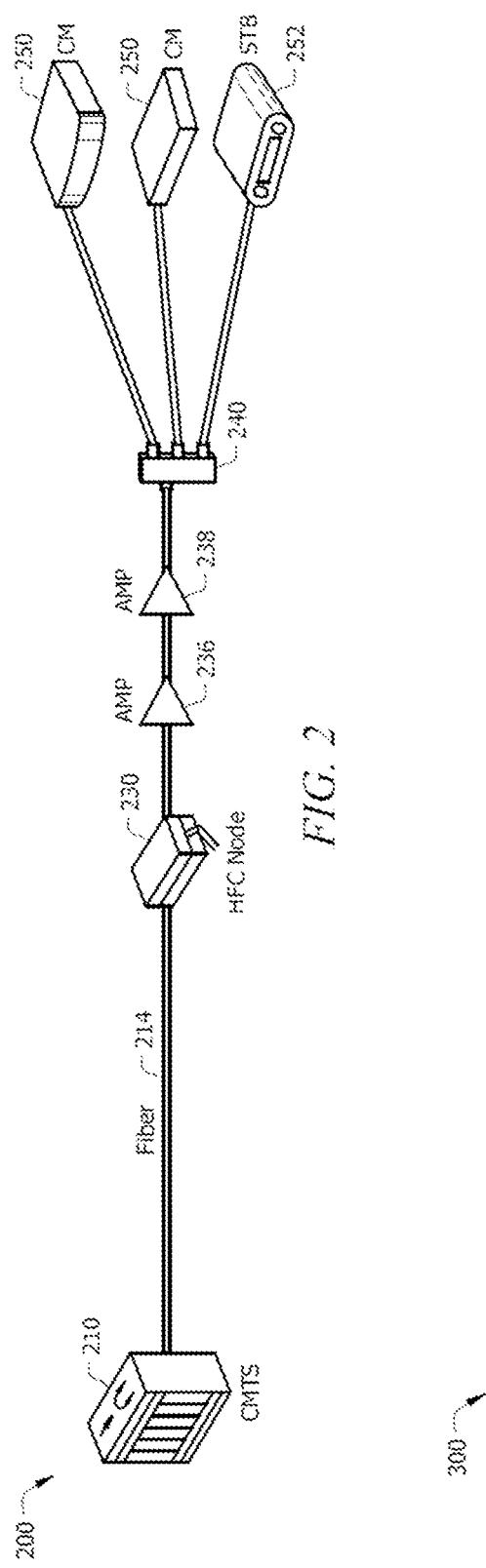
FIG. 2 illustrates an embodiment of a DOCSIS network.

FIG. 2 illustrates an embodiment of a DOCSIS network 200, which may be structurally similar to the EPoC network 100. The DOCSIS network 200 may comprise a cable modem termination system (CMTS) 210, at least one hybrid fiber coax (HFC) node 230, any number of cable modems (CMs) 250 and/or set-top box (STB) 252 arranged as shown in FIG. 2. Specifically, the HFC node 230 may be coupled to the CMTS 210 via an optical fiber 214, and the CMs 250 and/or STB 252 may be coupled to the HFC node 230 via electrical cables, one or more amplifiers (e.g., amplifiers 236 and 238), and at least one splitter 240). In implementation, the CMTS 210 may be considered equivalent or similar to the OLT 110 in FIG. 1, the HFC node 230 may be considered equivalent or similar to a CLT 130 in FIG. 1, and a CM 250 or a STB 252 may be considered equivalent or similar to a CNU 150 in FIG. 1. Note that the HFC node 230 may be remotely coupled to the CMTS 210, or sometimes reside in the CMTS 210. The CMTS 210 may sometimes be equipped with part or all of the functionalities of the HFC node 230. For example, methods and schemes taught herein (e.g., part of registration protocols) may be implemented by the CMTS 210 if desired. Instead of using a LLID, each CM 250, or STB 252, or each service in a CM 250, or each service in a STB 252, may be identifiable using a destination address (DA). The DA may be contained in a preamble of an Ethernet frame. A person of ordinary skill in the art will recognize similarities between the networks 100 and 200, and that schemes and methods taught by this disclosure will be applicable to the DOCSIS network 200 (adopting minor modifications). Accordingly, in the interest of conciseness the DOCSIS network 200 will not be described as detailed as the EPoC network 100.

Figure 3:
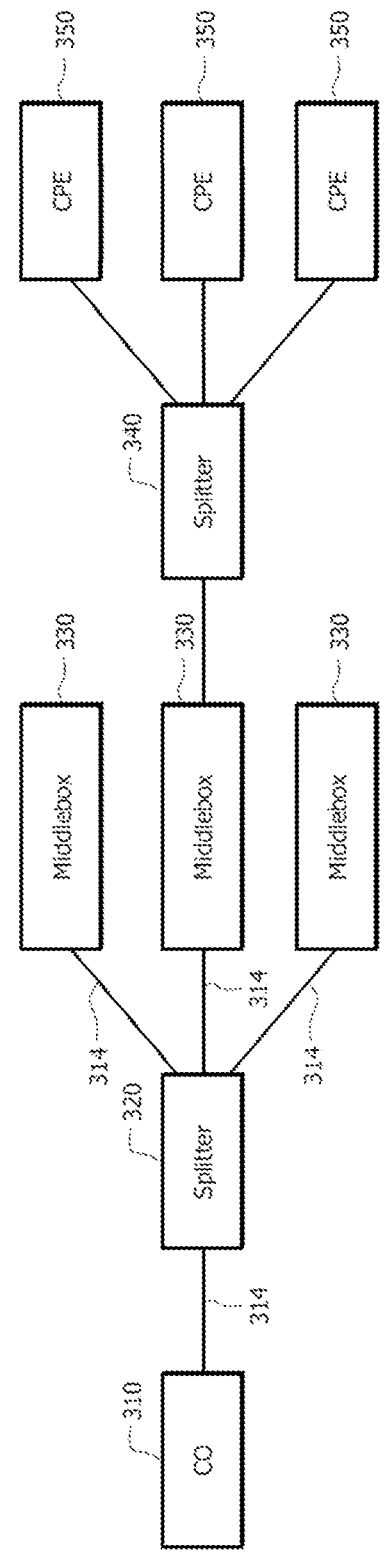
FIG. 3 illustrates an embodiment of a hybrid access network.

Although not illustrated and discussed exhaustively, it should be understood that principles of this disclosure may be applicable to any hybrid access network that employs an optical portion or segment. FIG. 3 illustrates an embodiment of a hybrid access network 300, which may be structurally similar to the EPoC network 100 or the DOCSIS network 200. The network 300 may comprise a CO equipment 310, one or more middleboxes 330, and a plurality of CPEs 350 arranged as shown in FIG. 3. Specifically, the middleboxes 330 may be coupled to the CO equipment 310 via an optical line comprising optical fibers 314 and at least one splitter 320. The CPEs 350 may be coupled to a middlebox 330 via electrical lines comprising electrical cables and at least one splitter 340. Note that a middlebox 330 may be remotely coupled to the CO equipment 310, or sometimes reside in the CO equipment 310. A CPE 350 may be a plug-and-play device from a user's perspective. Further, each CPE 350 may be identifiable using a MAC layer identifier 453 (in short as MAC ID) contained in a preamble of an Ethernet frame. This may include some cases where each service in a CPE 350 is identifiable using a MAC ID.

In implementation, the OLT 110 in FIG. 1 or the CMTS 210 in FIG. 2 may be considered a specific case of the CO equipment 310, a CLT 130 or a HFC node 230 may be considered a specific case of the middlebox 330, and a CNU 150 or a CM 250 or a STB 252 may be considered a specific case of the CPE 350. Depending on the application or context, a middlebox 330 may be referred to by various names, including but not limited to: CLT, HFC node, optical coax converter unit (OCU), coax media converter (CMC), media converter (MC), and fiber to coax unit (FCU). A person of ordinary skill in the art will recognize similarities between the networks 100, 200, and 300, and that schemes and methods taught for one specific type of network will be applicable to a more general network, such as the hybrid access network 300 (adopting minor modifications as necessary). Accordingly, in the interest of clarity, in following descriptions examplary embodiments of apparatus, systems, schemes, and methods will mainly direct toward an EPoC network, with the understanding that the same or similar principles may be applied to any general hybrid access network.

Figure 4:
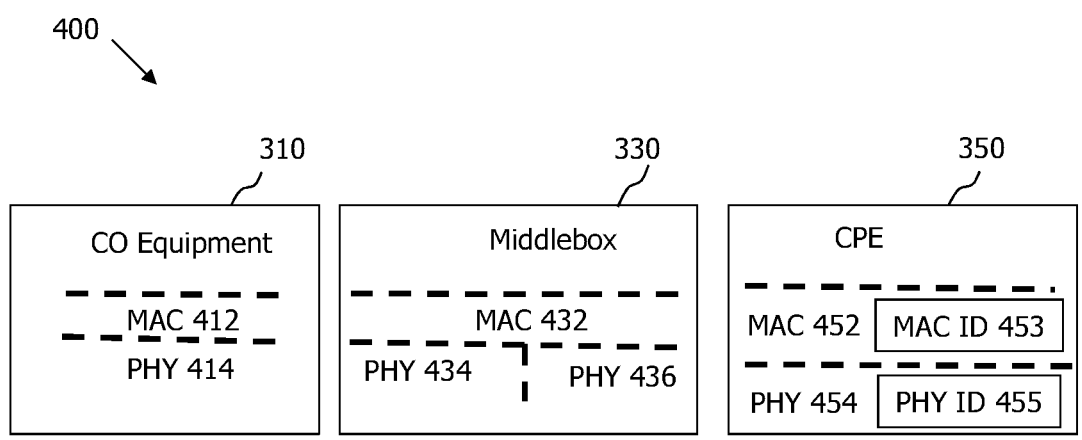
FIG. 4 illustrates an embodiment of part of a layer architecture in a hybrid access network.

FIG. 4 illustrates an embodiment of part of a layer architecture 400 in a hybrid access network (e.g., in the hybrid access network 300). As shown in FIG. 4, a CO equipment 310 may have a MAC layer 412 and a PHY layer 414 underneath. A middlebox 330 may have a MAC layer 432, and two PHY layers 434 and 436 underneath the MAC layer 432. A CPE 350 may have a MAC layer 452 and a PHY layer 454 underneath. The MAC layers 412, 432, and 452 may be similar to each other. For example, in an EPoC setting, the MAC layers 412, 432, and 452 may all be Ethernet MAC layers processing Ethernet frames. The middlebox 330 serves as an interface point between an optical segment and an electrical segment of the hybrid access, thus its PHY layer 434 may interact with the PHY layer 414, while its PHY layer 436 may interact with the PHY layer 454. In the EPoC setting, the PHY layers 414 and 434 may be EPON optical PHY layers, and the PHY layers 436 and 454 may be EPoC coax PHY layers.

The CO equipment 310 may have an identifier, and so may the CLT 330. A MAC layer identifier 453 (in short as MAC ID) may be used in the MAC layer 452, and a PHY layer identifier 455 (in short as PHY ID) may be used in the PHY layer 454. Both the MAC ID 453 and the PHY ID 455 may be used on different layers to identify the CPE 350. For example, the CO equipment 310 may assign the MAC ID 453 to the CPE 350, and the middlebox 330 may assign the PHY ID 455 to the CPE 350. Further, the middlebox 330 may store a lookup or mapping table, which comprises both the MAC ID 453 and the PHY ID 455 for multiple CPEs including the CPE 350. In an EPoC network, the MAC ID 453 may be a LLID of a CNU, while in a DOCSIS network, the MAC ID 453 may be a DA of a CM or a STB.

The layer architecture 400 may be considered a convergence layer architecture. Depending on the implementation, there may be a variety of layer architectures for a hybrid access network, including but not limited to, convergence layer, repeater architecture, bridged architecture, and any combination thereof. One with ordinary skill in the art will recognize that schemes and methods disclosed herein may be employed to any layer architectures.

Figure 5:
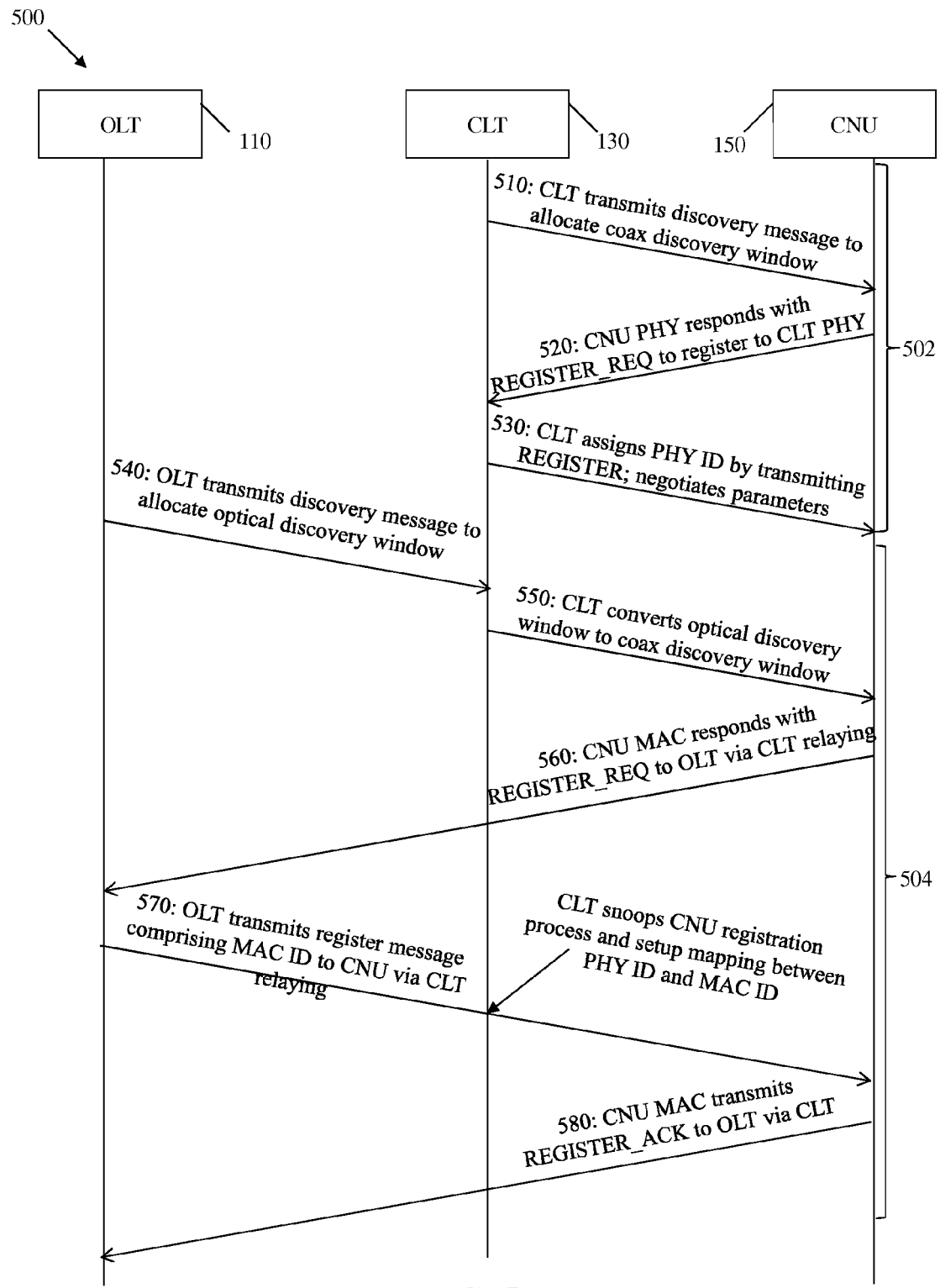
FIG. 5 illustrates an embodiment of a registration protocol.

FIG. 5 illustrates an embodiment of a registration protocol 500 implemented in an EPoC network (e.g., the EPoC network 100). The registration protocol 500 may be a MPCP that allows a CNU 150 to be registered in both the CLT 130 and the OLT 110. The registration protocol 500 may comprise any number of steps, e.g., 8 steps labeled as 510, 520, 530, 540, 550, 560, 570, and 580 in FIG. 5. Steps 510 to 530 may be considered a first stage 502 for registration of the CNU 150 in the CLT 130, while steps 540 to 580 may be considered a second stage 504 for registration of the CNU 150 in the CLT 130. Further, the stage 502 may be implemented on a physical layer (in short as PHY) to complete coax PHY discovery and parameter negotiation, while the stage 504 may be implemented on a media access control layer (in short as MAC) to complete EPoC MAC discovery and registration.

After the CNU 150 is powered on and connected to an electrical line (e.g., a coax cable in the EPoC network), the CNU 150 may begin listening to the downstream coax channel. In step 510, the CLT 130 may allocate a coax PHY discovery window or time period by transmitting or sending out a discovery message to all CNUs coupled to the CLT 130 via electrical lines. The discovery message may be broadcasted periodically for discovering newly connected CNUs. The downstream coax channel may comprise a control channel on reserved and spaced subcarriers or tones. The reserved tones may be selected from a frequency spectrum of the downstream channel to carry a downstream media access plan (MAP). The CNU 150 may be aware of the control channel. Specifically, by decoding the downstream MAP in every orthogonal frequency-division multiplexing (OFDM) symbol, the CNU 150 may detect or sense when the CLT 130 is performing step 510, that is, broadcasting discovery messages to all CNUs coupled to the CLT 130. The discovery message may comprise the downstream MAP, which contains all LLIDs of CNUs already registered in the OLT 110. Accordingly, CNUs already registered in the CLT 130 may ignore the discovery message, while the newly connected CNU 150 may process and respond to the discovery message.

A discovery message may comprise various information useful for communication between the CLT 130 and the CNU 150. In an embodiment, the discovery message may specify an upstream channel descriptor (UCD), which informs the CNU 150 which upstream frequencies to transmit on, symbol rate, modulation profile, and other parameters necessary for communication. In addition, the discovery message may comprise an upstream MAP, which may specify allocation of bandwidth to the CNU 150, that is, using which bandwidth the CNU 150 may respond to the CLT 130.

In step 520, the CNU 150 may transmit a register request message, denoted as REGISTER_REQ, to the CLT 130. The REGISTER_REQ may be transmitted and received on the PHY. In step 530, the CLT 130 may respond to the REGISTER_REQ with a register, denoted as REGISTER. The register message may be transmitted from the CLT 130 to the CNU 150 to indicate completion of registration. Alternatively, the CLT 130 may transmit a register continue message to the CNU 150 to indicate that further processes are needed before registration of the CNU 150 can be completed. Various PHY parameters and/or processes may be negotiated between the CLT 130 and the CNU 150 through the register request and response messages during steps 520 and 530. Examplary PHY parameters and processes include, but are not limited to, ranging, forward error correction, sounding, FEQ, profile negotiation in terms of channel frequencies, channel numbers, other parameters or processes, and combinations thereof.

Since PHY parameter and process negotiations (e.g., ranging) may sometimes take multiple attempts, the steps 520 and 530 may need to iterate more than once. Once negotiation is completed, the CLT 130 may assign a PHY ID to the CNU 150, and transmit a register message comprising the PHY ID to the CNU 150. The CLT 130 may also store the PHY ID in its own memory. After receiving the PHY ID, the CNU 150 has finished PHY registration with the CLT 130. Depending on the implementation, the CNU 150 may or may not send a register acknowledge message to the CLT 130 to confirm its registration. After registration, a coax channel between the CLT 130 and the CNU 150 may be initialized. Note that in stage 502, the CNU 150 may still lack a LLID it needs to communicate with the OLT 110.

In the stage 504, the CLT may facilitate the registration of the CNU 150 in the OLT 110 by serving as an intermediary. Specifically, in step 540, the OLT may allocate an optics discovery window by transmitting a second discovery message to the CLT 130 via an optical line. In implementation, the second discovery message may be broadcasted periodically (e.g., as multiple messages having the same or similar contents) to all CLTs coupled to the OLT 110 via optical lines, including the CLT 130 shown in FIG. 5. The second discovery message may be broadcasted for the purpose of registering all newly connected CNUs in the OLT 110.

In step 550, the CLT 130 may transform the optics discovery window to another coax discovery window for the CNU 150. Specifically, the CLT 130 may convert the second discovery message into a converted discovery message, and then transmit the converted discovery message to the CNU 150.

In step 560, the CLT 130 may relay a second register request message (i.e., REGISTER_REQ) from the CNU 150 to the OLT 110. Specifically, a MAC layer of the CNU 150 may transmit the second register request message to the CLT 130, which may then forward or relay it to the OLT 110. Note that relaying or forwarding a message herein may include cases in which certain processing are applied to the message prior to relaying. For example, to fit the second register request message for propagation in an optical line between the OLT 110 and the CLT 130, the CLT 130 may convert a structure of the second register request message as necessary. For another example, the CLT 130 may change a time stamp contained in a message to address potential time differences between the coax network and the optical network.

In step 570, the OLT 110 may parse and verify the second register request message. After verification, the OLT 110 may allocate or assign a LLID to the CNU 150 by transmitting a second register message (i.e., REGISTER) comprising the LLID to the CNU 150 via the CLT 130, which relays the register message. The LLID may be unique for the CNU 150. Depending on the implementation, the CNU 150 may have one LLID or each service in the CNU 150 may have its own LLID. The CNU 150 may store its assigned LLID(s) to indicate registration of itself in the OLT 110.

Further, the CLT 130 may snoop the process of CNU registration, that is, copy the LLID for the CNU 150 from the second register message, and store the LLID to its own memory. Recall that the CLT 130 may already have the PHY ID for the CNU 150, thus the CLT 130 may establish correspondence between the PHY ID and the LLID for the CNU 150. For example, the CLT 130 may setup a mapping or lookup table to indicate correspondence from the PHY ID to the LLID, or vice versa. In addition, for request and allocation of bandwidth, GATE and REPORT messages may be communicated between the OLT 110 and the CNU 150, and the CLT 130 may relay the messages.

In step 580, the CNU 150 may transmit a register acknowledge message, denoted as REGISTER_ACK, to the OLT 110 via the CLT 130. REGISTER_ACK may signal that the registration of the CNU 150 in the OLT 130 has been successful. Thus, a channel between the OLT 110 and the CNU 150 via the CLT 130 may be initialized, and data may be communicated. It can be seen that a MPCP has been effectively extended from an EPON to an EPoC.

Table 1 illustrates an embodiment of a LLID lookup table, which may be stored in a buffer of the CLT 130. The LLID lookup table may comprise various information, such as PHY IDs of all CNUs coupled to the CLT 130, LLIDs of all CNUs coupled to the CLT 130, corresponding profiles for each CNU, and channel parameters such as fast Fourier transform (FFT) sizes (4092 in Table 1). Note that in Table 1, each CNU may correspond to one LLID.

TABLE 1 an examplary LLID lookup table

| CNU ID | LLID | Profile Mapping | Channel Parameters |
|---|---|---|---|
| CNU 1 = PHY ID X | Null | Profile A | 4092 FFT |
| CNU 2 = PHY ID Y | . . . | | . . . |
| CNU N = PHY ID Z | | | |

Table 2 illustrates another embodiment of a LLID lookup table, which may be stored in a buffer of the CLT 130. The LLID lookup table may comprise various information, such as PHY IDs of all CNUs coupled to the CLT 130, LLIDs of all CNUs coupled to the CLT 130, corresponding profiles for each CNU, and channel parameters such as FFT sizes, cyclic prefix length, etc. Note that in Table 2, each CNU corresponds to multiple LLIDs, each of which may correspond to one service. Further, a profile (e.g., profile A) may comprise a modulation order or coding scheme applied to a specific CNU. Channel Parameters may contain OFDM channel information, such as symbol duration, FFT size, cyclic prefix (CP) length, and so on. Also, quality of service (QoS) may be based on each LLID, and may be extended from the OLT 110, to the CLT 130, and further to CNUs. QoS may be extended by applying traffic shaping based on each LLID to guarantee service provider's service level agreement (SLA).

TABLE 2 another examplary LLID lookup table

| CNU ID | LLID | Profile Mapping | Channel Parameters | QoS or Traffic Shaping |
|---|---|---|---|---|
| CNU 1 = PHY ID X | LLID1; LLID2 | Profile A | FFT Size; CP Length, etc. | Per LLID based QoS |
| CNU 2 = PHY ID Y | LLID3; LID4 | | ... | |
| CNU N = PHY ID Z | | | | |

By applying schemes disclosed herein, EPON MPCP signaling protocol may be extended to support EPoC network through OLT and CNU registration. LLID lookup table in the CLT may comprise information designed to map to the OFDM channel or profile information, so that the OLT can communicate with the CNUs across optical and electrical lines. Note that EPON ONUs may coexist with CNU in the EPoC architecture, where MPCP from OLT may run on either ONU connected to an EPON network, or a CNU connected to an EPoC network.

Figure 6A:
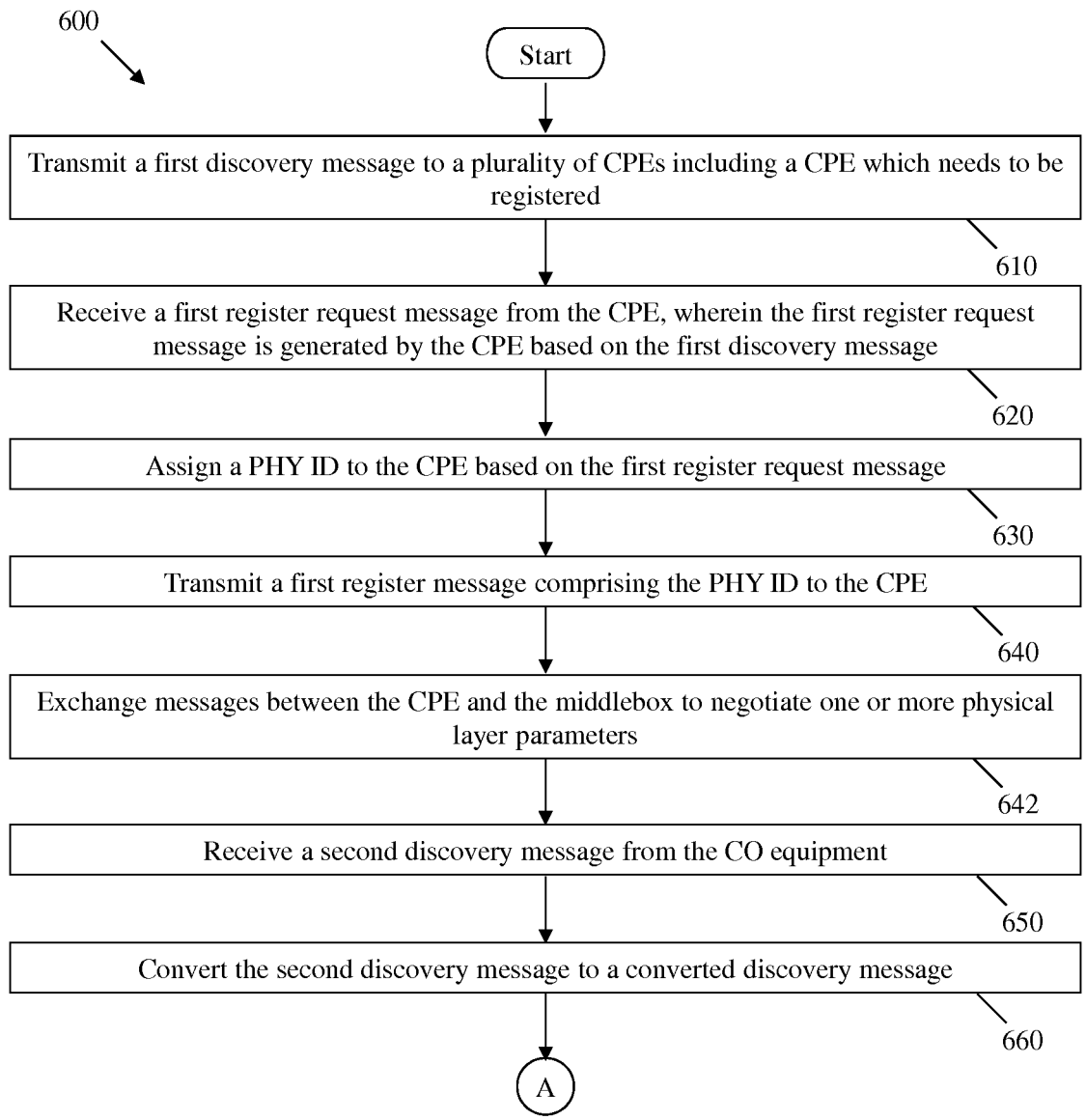
FIGS. 6A and 6B illustrate an embodiment of a registration method.
Figure 6B:
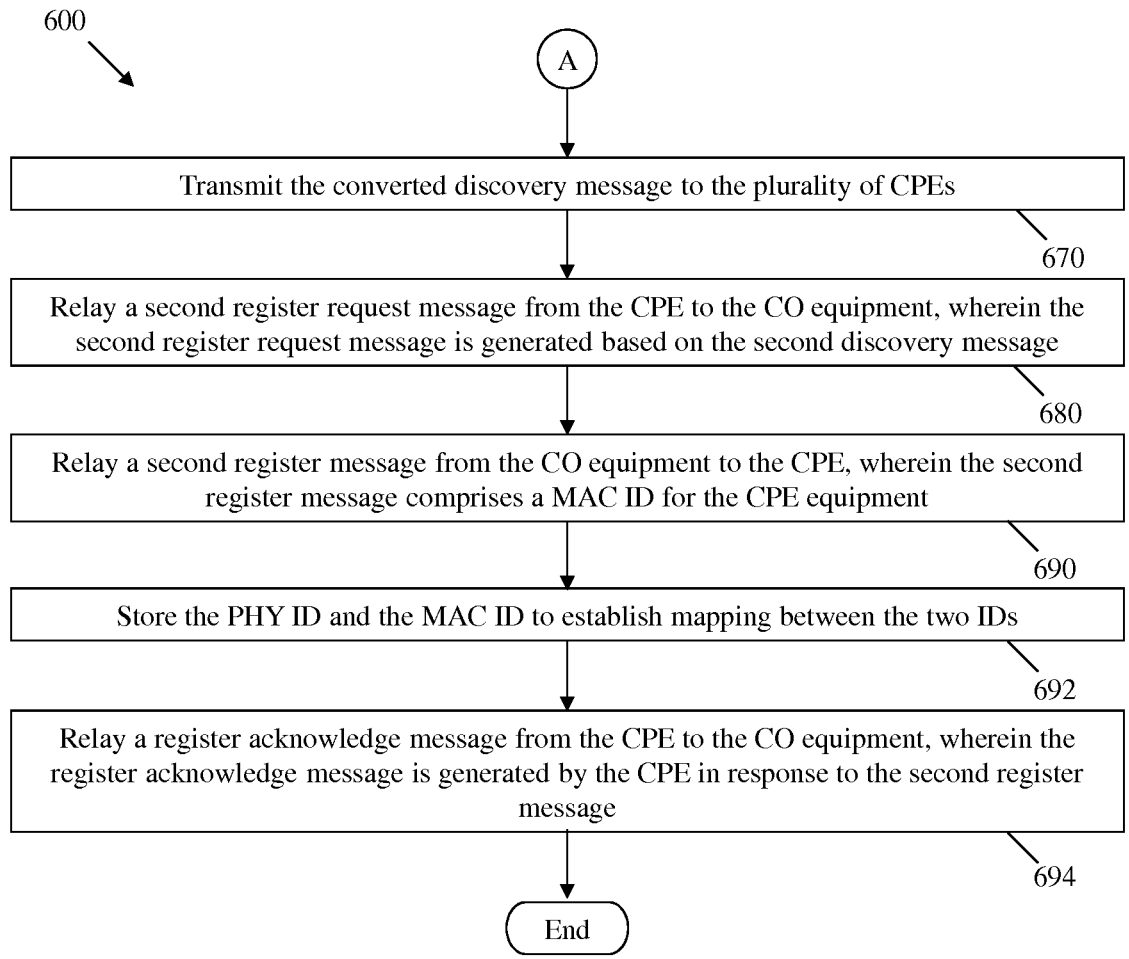

FIGS. 6A and 6B illustrate an embodiment of a registration method 600, which may be implemented by a middlebox (e.g., the middlebox 330) in a hybrid access network (e.g., the hybrid access network 300). The method 600 may be executed by the middlebox to interact with a CO equipment coupled to the middlebox via an optical line and a plurality of CPEs coupled to the middlebox via electrical lines. As a result, one or more newly connected CPEs may be registered in the middlebox and in the CO equipment.

The method 600 may start with step 610, wherein the method 600 may transmit a first discovery message to a plurality of CPEs including a CPE which needs to be registered. Recall that discovery messages may be broadcasted periodically, thus the first discovery message may be any of the broadcasted messages. In step 620, the method 600 may receive a first register request message (e.g., on the PHY layer) from the CPE, wherein the first register request message is generated by the CPE based on the first discovery message. In step 630, the method 600 may assign a PHY ID to the CPE based on the first register request message. The PHY ID may also be stored in the middlebox. In step 640, the method 600 may transmit a first register message comprising the PHY ID to the CPE. The first register message may be broadcasted to all CPEs, but other already-registered CPEs may ignore the message. In step 642, the method 600 may further exchange messages between the CPE and the middlebox to negotiate one or more physical layer parameters. Steps 610 to 640 or 642 may enable the CPE to be registered in the middlebox.

Next, in step 650, the method 600 may receive a second discovery message (e.g., on the MAC layer) from the CO equipment. In step 660, the method 600 may convert or transform the second discovery message to a converted discovery message that is suitable for transmission over electrical lines. In step 670, the method 600 may transmit the converted discovery message to the plurality of CPEs, wherein the converted discovery message may or may not comprise a source (e.g., an ID for the CO equipment and/or ID for the middlebox).

In step 680, the method 600 may relay a second register request message (e.g., on MAC layer) from the CPE to the CO equipment, wherein the second register request message is generated by the CPE based on the second discovery message. Recall that relaying a message may include situations in which conversion or processing are performed by the method 600, e.g., to enable the message to travel appropriately in a medium. For example, the middlebox may change a time stamp contained in a message to address potential time differences between the coax network and the optical network. In step 690, the method 600 may relay a second register message from the CO equipment to the CPE, wherein the second register message comprises a MAC ID for the CPE equipment. The MAC ID may be assigned by and transmitted from the CO equipment. In step 692, the method 600 may store the PHY ID and the MAC ID to establish mapping between the two IDs. Storing of the MAC ID may occur during or after relaying the second register message. In step 694, the method 600 may relay a register acknowledge message from the CPE to the CO equipment, wherein the register acknowledge message is generated by the CPE in response to the second register message. Steps 650 to 694 may be executed by the middlebox to facilitate registration of the CPE in the CO equipment.

It should be understood by one with ordinary skill in the art that modification and variations may be applied to the method 600 within the scope of this disclosure. For example, storing PHY IDs may occur at any suitable time, and mapping PHY IDs with MAC IDs may occur at any time, e.g., after all other steps are completed. In addition, mapping PHY IDs with MAC IDs may use any suitable data structure. Some steps may be skipped or changed in execution order if needed.

Figure 7:
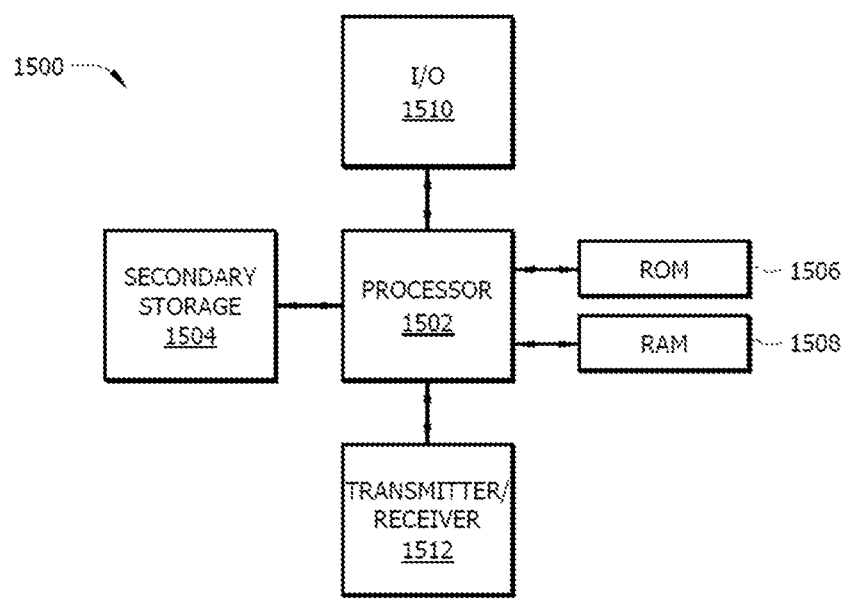
FIG. 7 illustrates an embodiment of a network node.

The schemes described above may be implemented on a network component, such as a computer or network component with sufficient processing power, memory resources, and network throughput capability to handle the necessary workload placed upon it. FIG. 7 is a schematic diagram of an embodiment of a network component or node 1500 suitable for implementing one or more embodiments of the systems and methods disclosed herein, such as the registration protocol 500 and the registration method 600.

The network node 1500 includes a processor 1502 that is in communication with memory devices including secondary storage 1504, read only memory (ROM) 1506, random access memory (RAM) 1508, input/output (I/O) devices 1510, and transmitter/receiver 1512. Although illustrated as a single processor, the processor 1502 is not so limited and may comprise multiple processors. The processor 1502 may be implemented as one or more central processor unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1502 may be configured to implement any of the schemes described herein, including the registration protocol 500 and the registration method 600. The processor 1502 may be implemented using hardware or a combination of hardware and software.

The secondary storage 1504 is typically comprised of one or more disk drives or tape drives and is used for non-volatile storage of data and as an over-flow data storage device if the RAM 1508 is not large enough to hold all working data. The secondary storage 1504 may be used to store programs that are loaded into the RAM 1508 when such programs are selected for execution. The ROM 1506 is used to store instructions and perhaps data that are read during program execution. The ROM 1506 is a non-volatile memory device that typically has a small memory capacity relative to the larger memory capacity of the secondary storage 1504. The RAM 1508 is used to store volatile data and perhaps to store instructions. Access to both the ROM 1506 and the RAM 1508 is typically faster than to the secondary storage 1504.

The transmitter/receiver 1512 may serve as an output and/or input device of the network node 1500. For example, if the transmitter/receiver 1512 is acting as a transmitter, it may transmit data out of the network node 1500. If the transmitter/receiver 1512 is acting as a receiver, it may receive data into the network node 1500. Further, the transmitter/receiver 1512 may include one or more optical transmitters, one or more optical receivers, one or more electrical transmitters, and/or one or more electrical receivers. The transmitter/receiver 1512 may take the form of modems, modem banks, Ethernet cards, universal serial bus (USB) interface cards, serial interfaces, token ring cards, fiber distributed data interface (FDDI) cards, and/or other well-known network devices. The transmitter/receiver 1512 may enable the processor 1502 to communicate with an Internet or one or more intranets. The I/O devices 1510 may be optional or may be detachable from the rest of the network node 1500. The I/O devices 1510 may include a video monitor, liquid crystal display (LCD), touch screen display, or other type of display. The I/O devices 1510 may also include one or more keyboards, mice, or track balls, or other well-known input devices.

It is understood that by programming and/or loading executable instructions onto the network node 1500, at least one of the processor 1502, the secondary storage 1504, the RAM 1508, and the ROM 1506 are changed, transforming the network node 1500 in part into a particular machine or apparatus (e.g., a CO equipment, a middlebox, or a CPE having the functionality taught by the present disclosure). The executable instructions may be stored on the secondary storage 1504, the ROM 1506, and/or the RAM 1508 and loaded into the processor 1502 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a processor configured to:
generate a discovery gate message;
process a register request message based on the discovery gate message;
generate a register message based on the register request message;
process and instruct forwarding of a gate message downstream from an optical line terminal (OLT) to a coaxial network unit (CNU) based on the register message; and
process and instruct forwarding of a register acknowledgement message based on the gate message;
a transmitter coupled to the processor and configured to transmit the discovery gate message, the register message, the gate message, and the register acknowledgement message; and
a receiver coupled to the processor and configured to receive the register request message, the gate message, and the register acknowledgement message.

2. The apparatus of claim 1, wherein the apparatus is a fiber coaxial unit (FCU).

3. The apparatus of claim 1, wherein the apparatus is one of a coaxial line terminal (CLT), a hybrid fiber-coaxial (HFC) node, an optical converter unit (OCU), a coaxial media converter (CMC), a media converter (MC), and a middlebox.

4. The apparatus of claim 1, wherein the transmitter is further configured to transmit the discovery gate message, the register message, and the gate message to the CNU.

5. The apparatus of claim 4, wherein the transmitter is further configured to transmit the register acknowledgement message to the OLT.

6. The apparatus of claim 1, wherein the receiver is further configured to receive the register request message and the register acknowledgement message from the CNU.

7. The apparatus of claim 6, wherein the receiver is further configured to receive the gate message from the OLT.

8. The apparatus of claim 1, further comprising:
a fiber portion configured to couple to the OLT via an optical portion of a network; and
a coaxial portion configured to couple to the CNU via an electrical portion of the network.

9. The apparatus of claim 1, wherein the apparatus is further configured to mediate between the OLT and the CNU.

10. A method implemented by an apparatus, the method comprising:
generating a discovery gate message;
transmitting the discovery gate message to a coaxial network unit (CNU);
receiving a register request message from the CNU and in response to the discovery gate message;
processing the register request message;
generating a register message in response to the register request message;
transmitting the register message to the CNU;
receiving a gate message from an optical line terminal (OLT) and in response to the register message;
processing the gate message;
forwarding the gate message downstream to the CNU;
receiving a register acknowledgement message from the CNU and in response to the gate message;
processing the register acknowledgement message; and
forwarding the register acknowledgement message to the OLT.

11. The method of claim 10, wherein the apparatus is a fiber coaxial unit (FCU).

12. The method of claim 10, wherein the apparatus is one of a coaxial line terminal (CLT), a hybrid fiber-coaxial (HFC) node, an optical converter unit (OCU), a coaxial media converter (CMC), a media converter (MC), and a middlebox.

13. The method of claim 10, further comprising:
coupling to the OLT via a fiber portion of the apparatus and an optical portion of a network; and
coupling to the CNU via a coaxial portion of the apparatus and an electrical portion of the network.

14. The method of claim 10, further comprising mediating between the OLT and the CNU.

* * * * *